(12) United States Patent
Noe

(10) Patent No.: US 11,718,535 B1
(45) Date of Patent: Aug. 8, 2023

(54) AMMONIA SYNTHESIS CONVERTER AND METHOD FOR SMALL PRODUCTION UNITS

(71) Applicant: SANsyco Consulting, LLC, Tomball, TX (US)

(72) Inventor: Stephen A Noe, Tomball, TX (US)

(73) Assignee: SANsyco Consulting, LLC, Tomball, TX (US)

( * ) Notice: Subject to any disclaimer, the term of this patent is extended or adjusted under 35 U.S.C. 154(b) by 0 days.

(21) Appl. No.: 17/815,848

(22) Filed: Jul. 28, 2022

Related U.S. Application Data

(60) Provisional application No. 63/313,123, filed on Feb. 23, 2022.

(51) Int. Cl.
*C01C 1/04* (2006.01)
*B01J 8/04* (2006.01)

(52) U.S. Cl.
CPC .......... *C01C 1/0417* (2013.01); *B01J 8/0469* (2013.01); *B01J 8/0496* (2013.01); *C01C 1/0411* (2013.01); *C01C 1/0482* (2013.01); *B01J 2208/0053* (2013.01); *B01J 2208/00168* (2013.01); *B01J 2208/00371* (2013.01)

(58) Field of Classification Search
None
See application file for complete search history.

(56) References Cited

U.S. PATENT DOCUMENTS

| | | | |
|---|---|---|---|
| 1,952,021 A * | 3/1934 | Reed | C01C 1/0405 |
| | | | 423/361 |
| 4,904,453 A | 2/1990 | Zardi | |
| 7,332,138 B2 | 2/2008 | Gupta et al. | |
| 9,687,801 B2 | 6/2017 | Rizzi et al. | |

(Continued)

FOREIGN PATENT DOCUMENTS

| | | |
|---|---|---|
| CN | 2047263 U | 11/1989 |
| CN | 1016318 B | 4/1992 |
| CN | 2102795 U | 4/1992 |

(Continued)

OTHER PUBLICATIONS

Delong, D.F., Removal and Replacement of Catalyst in an Ammonia Converter, AIChE, 47-52, 1970, 13:009.

(Continued)

*Primary Examiner* — Jennifer A Leung
(74) *Attorney, Agent, or Firm* — Lundeen & Lundeen PLLC; Daniel N. Lundeen

(57) ABSTRACT

An ammonia synthesis converter for small production units which provides full access for routine maintenance and catalyst replacement while providing adequate catalyst pressure drop to ensure kinetic performance and reduce heat leak from the catalyst beds. A shell has a removable top head and an annular basket is removably mounted in the shell. First and second catalyst beds are disposed in the annular zone of the basket for axial down-flow in series. A quench gas is introduced into effluent from the first catalyst bed and the resulting mixture into a top of the second catalyst bed. A (Continued)

feed-effluent interchanger in the inner basket zone is adapted to receive effluent from the second catalyst bed and indirectly heat a feed to the first catalyst bed. Also, methods of operating and servicing the converter.

24 Claims, 2 Drawing Sheets

(56) References Cited

U.S. PATENT DOCUMENTS 10,960,375 B2  3/2021  Noe

FOREIGN PATENT DOCUMENTS

| | | | |
|---|---|---|---|
| CN | 1065845 A | 11/1992 | |
| DE | 1244730 B * | 7/1967 | |
| EP | 0114138 A2 * | 7/1984 | ............ B01J 8/0005 |
| EP | 222069 A2 * | 5/1987 | ............ B01J 8/0415 |
| EP | 386692 A2 * | 9/1990 | ............ B01J 8/0415 |
| EP | 1419813 A1 | 9/2003 | |
| JP | 60110328 A * | 6/1985 | ............ B01J 8/0415 |
| WO | 9312032 A1 | 6/1993 | |
| WO | 2013097958 A1 | 7/2013 | |
| WO | 2019121951 A1 | 6/2019 | |

OTHER PUBLICATIONS

Berchthold, C., Evolution of a new NH3 synthesis catalyst, Nitrogen+Syngas 364, 44-48, Mar.-Apr. 2020, available at https://www.casale.ch/downloads/technologies/31-ammonia-synthesis-catalyst/file.

Liang, Chen, Green Haber-Bosch Process: A small-scale ammonia reactor system design, Masters Thesis, Delft University of Technology, Dec. 18, 2021.

* cited by examiner

AMMONIA SYNTHESIS CONVERTER AND METHOD FOR SMALL PRODUCTION UNITS

CROSS REFERENCE TO RELATED APPLICATION

This application is a non-provisional of and claims the benefit of priority to co-pending U.S. App. No. 63/313,123, filed Feb. 23, 2022, which is hereby incorporated herein by reference.

BACKGROUND

Field

Embodiments of the present invention relate to a vertical ammonia converter design for use with small production units with proportionally small flows and synthesis catalyst volumes.

Description of the Related Art

As the world demand for ammonia has increased over the years, production units have also increased in size to take advantage of the economies of scale as equipment designs and fabrication capabilities for large equipment items have improved. Reactor designs used for ammonia synthesis have evolved to provide higher conversions and lower pressure drop to limit the impact of larger process flows. This is required since catalyst bed volumes tend to scale linearly with production as do flow rates while the flow areas controlling pressure drop only scale to a 2/3 exponent for the same bed length/diameter (L/D) aspect ratio. Vertically thinner (shorter) beds with higher flow areas (i.e., lower L/D) are therefore required for larger production rates to maintain acceptable pressure drop, but the diameter is limited because of constraints on fabrication and shipping. Axial-flow catalyst bed designs used in early converters for smaller plants have therefore been significantly replaced by radial-flow catalyst bed designs and horizontal down-flow bed designs which minimize pressure drop and allow the use of smaller, higher activity catalyst for improved conversion. In particular, the use of radial-flow designs comprising annular catalyst beds nested around internal heat exchangers allowed the catalyst pressure drop to be reduced via increasing bed height (and flow area) while reducing bed thickness (and flow depth), while the nested bed/exchanger design moderated the increase in converter L/D resulting from the taller radial beds.

In addition to reducing pressure drop, multi-bed converters using direct quench with feed gas to cool inter-bed gas have been significantly replaced with converters using indirect quench via internal heat exchangers (intercoolers) to cool inter-bed gas. Intercooling avoids the dilution effect of direct quench and also allows full flow of the feed gas through all catalyst beds for maximum conversion. These benefits are provided at the cost of additional complexity and equipment expense for the converter which must be offset by the reduction in energy consumption provided by the more efficient intercooled design.

The production of ammonia is energy intensive and produces a significant amount of carbon dioxide ($CO_2$), much or all of which is released to atmosphere depending on whether there is an adjoining unit to utilize some of the process $CO_2$ as feedstock, e.g., an adjoining urea synthesis unit. Much of the energy consumption is tied to the endothermic process of producing hydrogen ($H_2$) from natural gas (NG) via the process of steam-reforming in the plant front-end. A large furnace (primary reformer) is typically used to provide most of the required energy as heat while the furnace flue gas stream releases significant $CO_2$ to the atmosphere.

The recent push towards "green" technologies with lower green-house gas emissions has led to much research regarding the production of $H_2$. In particular, renewable energy sources such as wind and solar can provide electricity for generating $H_2$ through the process of electrolysis, eliminating the process and flue gas $CO_2$ emissions associated with the steam-reforming process. The potential for generating ammonia in a simpler flow-scheme where most of the plant front-end is replaced by wind turbines or solar panels and an electrolysis unit also supports the use of smaller units which would otherwise be economically impractical. Such small units can be strategically located to generate product for local supply only, thereby avoiding the cost of transportation associated with providing product to and from the general market.

While modern large ammonia units typically produce 2000 MTPD of product or more, the focus of this design is to service small units with productions less than 100 MTPD. Just as larger plants justify the use of more complex designs to improve efficiency, economies of scale typically dictate the use of simpler flowsheets and equipment designs with smaller units to minimize the required equipment cost. This is particularly true for small units powered by dedicated green energy sources where there is less cost advantage for reducing energy consumption than when importing power from the grid.

Small converters have issues which become problematic compared to larger converters. The subject design addresses two of the major concerns with small converters. First, the limited diameter prohibits direct access through internal manways for routine maintenance and inspection of the converter. Second, sufficiently small units can suffer from excessively low catalyst pressure drop which can lead to maldistribution and penalize kinetic performance. Maintaining adequate pressure drop requires using such small diameters for the catalyst beds that the L/D ratio becomes excessive for traditional stacked bed arrangements, making maintenance difficult. In addition, tall (or long), thin reactors experience increased heat leak due to greater surface area which can jeopardize the ability to sustain reaction temperatures in the beds. A design is needed which accommodates inspection, maintenance and catalyst change-out while ensuring adequate catalyst pressure drop without experiencing excessive heat loss.

SUMMARY OF THE INVENTION

Broadly, the present invention provides an ammonia synthesis converter design for small ammonia plants which provides access for routine maintenance, inspection and catalyst replacement while providing adequate catalyst pressure drop for uniform flow distribution and limiting heat leak from the catalyst beds. The design comprises a two-bed direct-quench axial-flow converter in which the catalyst beds are annular shaped and preferably vertically stacked, with an internal feed-effluent heat exchanger (interchanger) nested inside the beds for providing feed preheat. Since flow through the annular beds is axial rather than radial, pressure drop can be increased as required to maintain adequate distribution by increasing bed height (and flow depth) while reducing bed thickness (and flow area). Nesting the annular beds around the interchanger reduces the converter L/D ratio which also reduces surface area for a given converter volume, thereby limiting heat loss from the system. Use of the direct-quench system for cooling interbed gas simplifies the overall design compared to intercooling for reduced equipment cost and maintenance.

In one aspect, embodiments of the present invention provide an ammonia synthesis converter comprising a shell having a removable top head and an annular basket removably mounted in the shell. The annular basket has inner and outer walls and defines an annular zone between the inner and outer walls, an inner basket zone located centrally within the inner wall, and an outer basket zone between the outer wall and the shell. First and second catalyst beds are disposed in the annular zone of the basket for axial down-flow in series, the first and second catalyst beds comprising catalyst to convert a feed mixture of hydrogen and nitrogen to ammonia. A quench gas supply is provided to introduce quench gas into a first effluent from the first catalyst bed and a flow path introduces the resulting mixture into a top of the second catalyst bed. A feed-effluent heat exchanger (interchanger) in the inner basket zone is adapted to receive a second effluent from the second catalyst bed and indirectly heat a feed to the first catalyst bed. A bypass gas distributor is provided to introduce exchanger bypass gas into the hot feed to the first catalyst bed and a flow path introduces the resulting mixture into a top of the first catalyst bed. A flow path is optionally provided to supply the feed through the outer basket zone to the interchanger. The first and second catalyst beds are preferably stacked vertically in the annular zone of the basket.

Embodiments herein also provide a method of servicing the ammonia synthesis converter just described, wherein the first catalyst bed comprises a single removable insert in an upper portion of the annular zone, the insert depending from a top outer basket flange, the insert comprising inner and outer insert walls, a top inlet distributor, a catalyst bed zone, bed support and an interbed quench system and a gas distributor at a lower end of the insert. The method comprises the steps of:
disconnecting internal piping through a manway in the top pressure shell head;
unbolting and removing the top head from the pressure shell;
disconnecting packing glands at the piping penetrations though the top basket cover plate;
unbolting the common mounting for the top cover plate and bed insert;
removing the top cover plate to access the first bed;
removing the top inlet distributor and catalyst in the first bed;
removing the insert from the upper portion of the annular zone to access the catalyst in the second bed; and
removing the catalyst in the second bed.
Optionally, the feed-effluent interchanger can also be removed from the inner basket zone.

In another aspect of the invention, embodiments herein provide an ammonia synthesis method comprising providing a shell with a removable top head and removably mounting an annular basket in the shell. The annular basket has inner and outer walls and defines an annular zone between the inner and outer walls, an inner basket zone located centrally within the inner wall, and an outer basket zone between the outer wall and the shell. Gas is passed axially in down-flow through first and second catalyst beds disposed in the annular zone of the basket in series, the first and second catalyst beds comprising catalyst to convert a feed mixture of hydrogen and nitrogen to ammonia. Quench gas is introduced into a first effluent from the first catalyst bed and the resulting mixture is introduced into a top of the second catalyst bed. A second effluent from the second catalyst bed is received in a feed-effluent interchanger in the inner basket zone to indirectly heat a feed to the first catalyst bed. Exchanger bypass gas from a bypass gas distributor is introduced into the hot feed to the first catalyst bed and the resulting mixture is introduced into a top of the first catalyst bed. Cool converter feed gas is supplied through the outer basket zone to the interchanger. The first and second catalyst beds are preferably stacked vertically in the annular zone of the basket.

BRIEF DESCRIPTION OF THE DRAWINGS

The present invention will be described in detail with references to the accompanying figure wherein.

DETAILED DESCRIPTION

Figure 1:
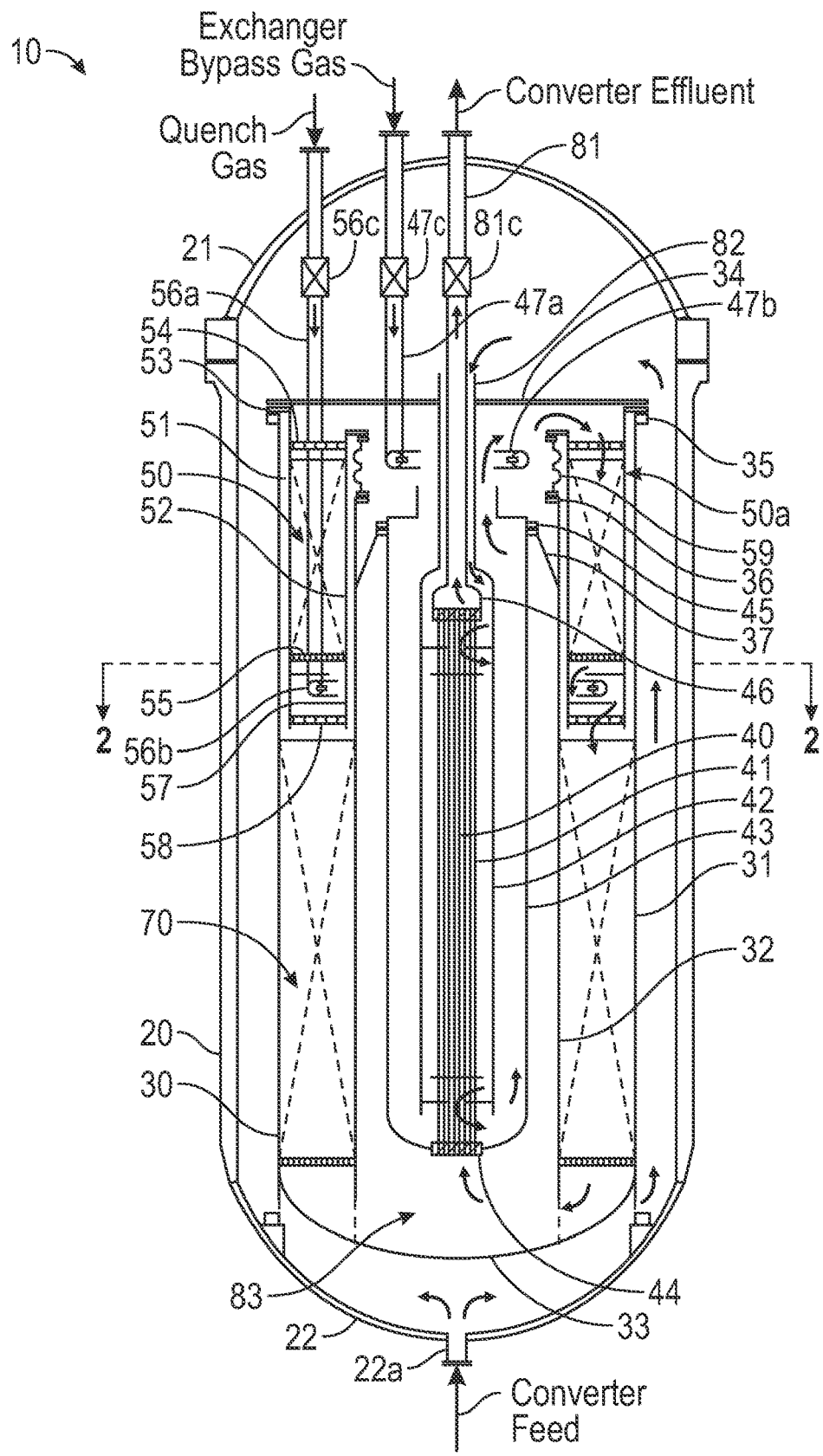
FIG. 1 depicts a schematic view of the 2-bed converter design with an internal feed-effluent heat exchanger for providing feed preheat and direct quench system for cooling inter-bed gas according to the present invention.

Ammonia converters in large plants have manways through the pressure shell and internal basket including gas partitions and bed supports to allow direct entry for routine maintenance and inspection as well as catalyst change-out. The minimum size for a functional manway prohibits using direct entry to a converter when the vessel diameter is too small. For such vessels, an alternate design approach is needed where sufficient access is provided by incorporating a modular design which can be efficiently dismantled and reassembled as required.

In one aspect, an ammonia synthesis converter comprises:
a shell having a removable top head;
an annular basket removably mounted in the shell, the annular basket comprising inner and outer walls and defining an annular zone between the inner and outer walls, an inner basket zone located centrally within the inner wall and an outer basket zone between the outer wall and the shell;
first and second catalyst beds disposed in the annular zone of the basket for axial down-flow in series, the first and second catalyst beds comprising catalyst to convert a feed mixture of hydrogen and nitrogen to ammonia;
a quench gas supply to introduce quench gas into a first effluent from the first catalyst bed and a flow path to introduce the resulting mixture into a top of the second catalyst bed;
a feed-effluent interchanger in the inner basket zone to receive a second effluent from the second catalyst bed and indirectly heat a feed to the first catalyst bed;
a bypass gas distributor to introduce exchanger bypass gas into the hot feed to the first catalyst bed and a flow path to introduce the resulting mixture into a top of the first catalyst bed; and
a flow path to supply the feed through the outer basket zone to the interchanger.

The ammonia synthesis converter preferably has a design capacity of 100 MTPD or less.

In any embodiment, the annular basket can further comprise a removable top cover plate.

In any embodiment, the feed-effluent interchanger is removably mounted on a closed support (preferably an inverted frustoconical support) connected to the inner basket wall. Preferably, the feed effluent interchanger comprises an external shroud attached to a bottom exchanger inlet tubesheet and open at a top, an outside top shroud flange which attaches to an upper closed, flanged support (such as an inverted frustoconical support) projecting inwards from the inner basket wall, an exchanger shell open at bottom and extending upwards to enclose an exchanger tube outlet channel, contiguous with a shellside feed pipe penetrating a top basket cover plate, and an exchanger tube outlet channel contiguous with a converter outlet pipe extending upwards from the outlet channel to the top pressure shell head and nested inside the shellside feed pipe to provide preheat of feed gas flowing downwards on the exchanger shellside before returning to the exchanger top via an annulus between exchanger shell and shroud while cooling the effluent from the second catalyst bed flowing up the exchanger tubeside before exiting the top head of the converter.

In a preferred embodiment, the first catalyst bed comprises a single removable insert in an upper portion of the annular zone, the insert depending from a top outer basket flange, the insert comprising inner and outer insert walls, a catalyst bed zone, and an interbed quench system and a gas distributor at a lower end of the insert, the interbed quench system comprising a quench gas distributor and a mixing zone, the gas distributor receiving the gas from the mixing zone and distributing the gas to an inlet to the second catalyst bed. The second catalyst bed is preferably located directly below the first catalyst bed and is fully accessible from above when the first catalyst bed (insert) is removed, i.e., the first and second catalyst beds are stacked vertically in the annular zone of the basket.

Preferably, the ammonia synthesis converter further comprises an expansion joint to form a seal between a top of the inner insert wall and a top of the inner basket wall, more preferably wherein the expansion joint comprises a bellows or packing gland.

In another aspect, an ammonia synthesis method comprises:
providing a shell with a removable top head;
removably mounting an annular basket in the shell, the annular basket comprising inner and outer walls and defining an annular zone between the inner and outer walls, an inner basket zone located centrally within the inner wall and an outer basket zone between the outer wall and the shell;
passing gas axially in down-flow through first and second catalyst beds disposed in the annular zone of the basket in series, the first and second catalyst beds comprising catalyst to convert a feed mixture of hydrogen and nitrogen to ammonia, preferably wherein the first and second catalyst beds are stacked vertically;
introducing quench gas into a first effluent from the first catalyst bed and introducing the resulting mixture into a top of the second catalyst bed;
receiving a second effluent from the second catalyst bed in a feed-effluent interchanger in the inner basket zone to indirectly heat a feed to the first catalyst bed;
introducing exchanger bypass gas from a bypass gas distributor into the hot feed to the first catalyst bed and introducing the resulting mixture into a top of the first catalyst bed; and
supplying the feed through the outer basket zone to the interchanger.

The method preferably has a process design capacity of 100 MTPD or less.

The method can further comprise removably mounting a top cover plate onto the annular basket, and optionally removing the top cover plate to access the annular basket.

The method preferably further comprises removably mounting the feed-effluent interchanger on a closed support connected to the inner basket wall, such as an inverted frustoconical support. Preferably the method further comprises attaching an external shroud of the feed-effluent interchanger to a bottom exchanger inlet tubesheet, attaching an outside top shroud flange to an upper flanged conical support projecting inwards from the inner basket wall, providing an exchanger shell open at a bottom and extending upwards to enclose an exchanger tube outlet channel, contiguous with a shellside feed pipe penetrating a top basket cover plate, extending a converter outlet pipe contiguous with an exchanger tube outlet channel upwards from the outlet channel to the pressure shell head, and nesting the converter outlet pipe inside the shellside feed pipe, feed gas from the shellside feed pipe preheated by flowing downwards on the exchanger shellside before returning to the exchanger top via an annulus between exchanger shell and shroud while cooling the effluent from the second catalyst bed flowing up the exchanger tubeside before exiting the top head. The method can further comprise removing the feed-effluent exchanger for maintenance or replacement.

In a preferred embodiment, the method can further comprise providing the first catalyst bed as a single removable insert in an upper portion of the annular zone, the insert depending from a top outer basket flange, the insert comprising inner and outer insert walls, a catalyst bed zone, and an interbed quench system and gas distributor at a lower end of the insert, the interbed quench system comprising a quench gas distributor and a mixing zone, the gas distributor receiving the gas from the mixing zone and distributing the gas to an inlet to the second catalyst bed. Preferably, the method further comprises sealing a top of the insert wall to a top of the inner basket wall, preferably using an expansion joint, more preferably a bellows or packing gland. Preferably, the method further comprises locating the second catalyst bed directly below the first catalyst bed, wherein the second catalyst bed is fully accessible from above when the first catalyst bed is removed.

In a further aspect, an ammonia synthesis converter having a design capacity of 100 MTPD or less comprises:
a shell having a removable top head;
an annular basket mounted in the shell, the annular basket comprising inner and outer walls and defining an annular zone between the inner and outer walls, an inner basket zone located centrally within the inner wall and an outer basket zone between the outer wall and the shell;
wherein the annular basket further comprises a removable top cover plate;
first and second catalyst beds disposed in the annular zone of the basket for axial down-flow in series, the first and second catalyst beds comprising catalyst to convert a feed mixture of hydrogen and nitrogen to ammonia, wherein the first catalyst bed comprises a single removable insert in an upper portion of the annular zone, the insert depending from a top outer basket flange, the insert comprising inner and outer insert walls, a catalyst bed zone, and an interbed quench system and a gas distributor at a lower end of the insert, the interbed quench system comprising a quench gas distributor and a mixing zone, the gas distributor receiving the gas from the mixing zone and distributing the gas to an inlet to the second catalyst bed, wherein the second catalyst bed is located directly below the first catalyst bed and is fully accessible from above when the first catalyst bed is removed;

an expansion joint to form a seal between a top of the inner insert wall and a top of the inner basket wall, preferably wherein the expansion joint comprises a bellows or packing gland;

a quench gas supply to introduce quench gas into a first effluent from the first catalyst bed and a flow path to introduce the resulting mixture into a top of the second catalyst bed;

a feed-effluent interchanger in the inner basket zone to receive a second effluent from the second catalyst bed and indirectly heat a feed to the first catalyst bed, wherein the feed-effluent interchanger is removably mounted on a closed support, preferably a closed inverted frustoconical support, connected to the inner basket wall;

a bypass gas distributor to introduce exchanger bypass gas into the hot feed to the first catalyst bed and a flow path to introduce the resulting mixture into a top of the first catalyst bed; and a flow path to supply the feed through the outer basket zone to the interchanger.

Preferably, the feed-effluent interchanger in this embodiment comprises an external shroud attached to a bottom exchanger inlet tubesheet and open at a top, an outside top shroud flange which attaches to an upper flanged conical support projecting inwards from the inner basket wall, an exchanger shell open at bottom and extending upwards to enclose an exchanger tube outlet channel, contiguous with a shellside feed pipe penetrating a top basket cover plate, and an exchanger tube outlet channel contiguous with a converter outlet pipe extending upwards from the outlet channel to the top pressure shell head and nested inside the shellside feed pipe to provide preheat of feed gas flowing downwards on the exchanger shellside before returning to the exchanger top via an annulus between exchanger shell and shroud while cooling the effluent from the second catalyst bed flowing up the exchanger tubeside before exiting the top head of the converter.

In yet a further aspect, a modular catalyst bed insert for an ammonia synthesis converter comprises:

an annular housing comprising inner and outer insert walls;

an outer flange at a top of the outer insert wall for hanging the insert in the converter;

a catalyst bed zone disposed on a bed support between the inner and outer insert walls;

an inlet gas distributor between the inner and outer insert walls disposed above the catalyst bed;

a quench system comprising a quench gas supply pipe passing through the inlet gas distributor, the catalyst bed, and the bed support, to a quench gas distributor disposed in a mixing zone below the bed support for mixing the quench gas with effluent from the catalyst bed; and an outlet gas distributor located below the mixing zone.

In yet another aspect, a modular catalyst bed for an ammonia synthesis converter comprises:

an annular basket removably mountable in a reactor shell, the annular basket comprising inner and outer walls and defining an annular zone between the inner and outer walls and an inner basket zone located centrally within the inner wall, a top flange located at a top of the outer wall, and a removable top cover plate removably mountable to the top flange;

first and second catalyst beds stacked vertically in the annular zone of the basket for axial down-flow in series, the first and second catalyst beds comprising catalyst to convert a feed mixture of hydrogen and nitrogen to ammonia, the first catalyst bed disposed in a removable insert disposed in an upper portion of the annular basket and the second catalyst bed disposed in a lower portion of the annular basket directly below the removable insert;

a feed-effluent interchanger in the inner basket zone to receive a second effluent from the second catalyst bed and indirectly heat a feed to the first catalyst bed, wherein the feed-effluent interchanger comprises an external shroud attached to a bottom exchanger inlet tubesheet and open at a top, an outside top shroud flange which attaches to an upper flanged closed support projecting inwards from the inner basket wall, an exchanger shell open at bottom and extending upwards to enclose an exchanger tube outlet channel, contiguous with a shellside feed pipe penetrating a top basket cover plate, and an exchanger tube outlet channel contiguous with a converter outlet pipe extending upwards from the outlet channel through the top cover plate and nested inside the shellside feed pipe passing through the top cover plate to provide preheat of feed gas flowing downwards on the exchanger shellside before returning to the exchanger top via an annulus between exchanger shell and shroud while cooling the effluent from the second catalyst bed flowing up the exchanger tubeside before exiting the modular catalyst bed; and a bypass gas distributor to introduce exchanger bypass gas from a supply pipe passing through the top cover plate into the hot feed to the first catalyst bed and a flow path to introduce the resulting mixture into a top of the first catalyst bed;

wherein the insert comprises:

an annular housing comprising inner and outer insert walls, wherein an upper end of the inner insert wall is spaced below the top cover plate to provide the flow path for feed gas to enter the insert;

an outer flange at a top of the outer insert wall to hang the insert from the top flange of the annular basket;

a catalyst bed zone disposed on a bed support between the inner and outer insert walls;

an inlet gas distributor disposed above the first catalyst bed between the inner and outer insert walls;

a quench system comprising a quench gas supply pipe passing through the top cover plate, the inlet gas distributor, the catalyst bed, and the bed support, to a quench gas distributor disposed in a mixing zone below the bed support for mixing the quench gas with effluent from the catalyst bed; and an outlet gas distributor located below the mixing zone to distribute gas to a top of the second catalyst bed.

Figure 2:
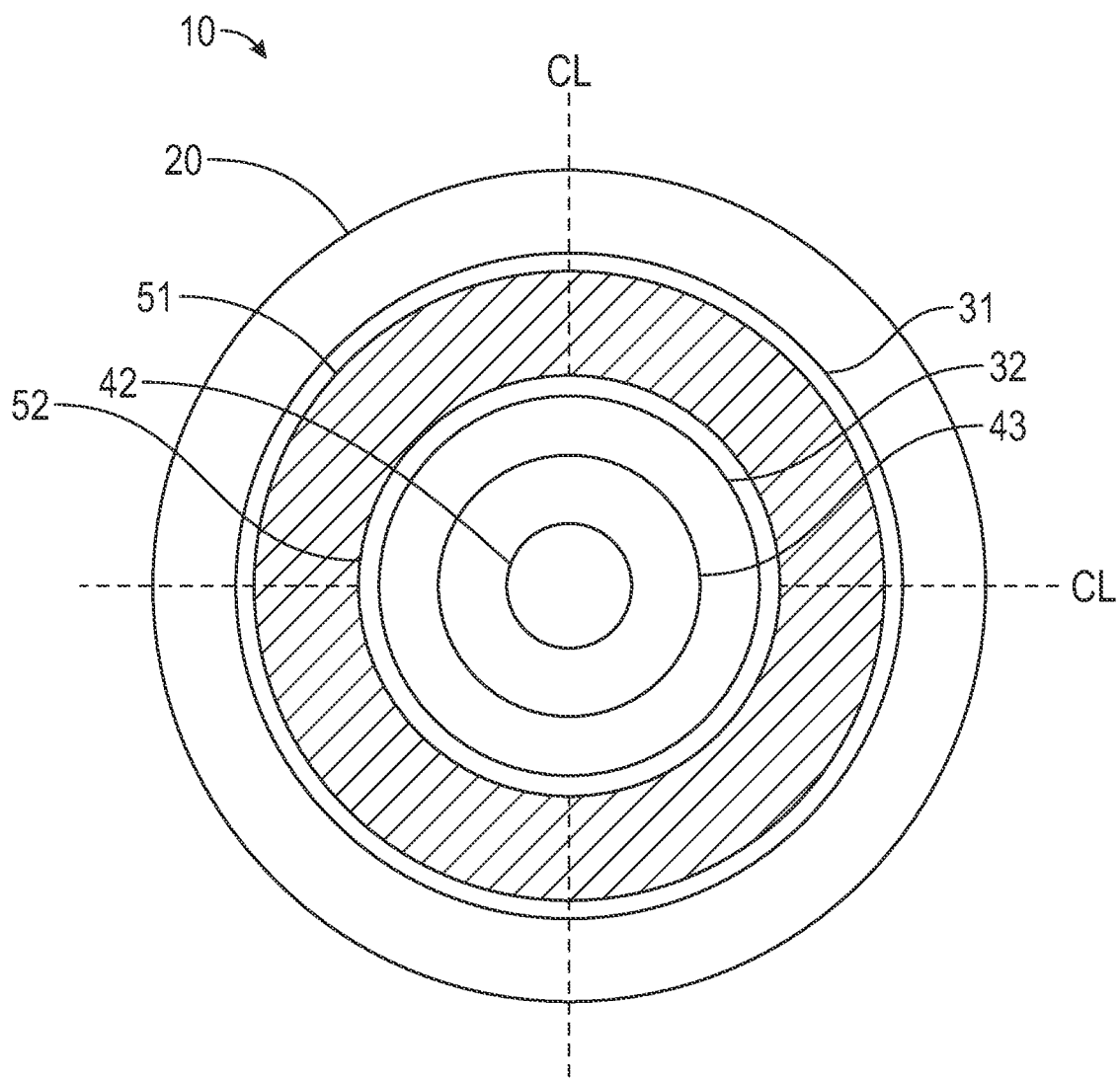
FIG. 2 is a cross-sectional view of the converter of FIG. 1 as seen along the lines 2-2.

An embodiment of the disclosed design is depicted in FIGS. 1-2 wherein the converter 10 contains a feed-effluent exchanger 40 for providing feed gas preheat to reach reaction temperature and two vertically stacked catalyst beds 50, 70 with direct quench between beds to cool the inter-bed gas. Ammonia synthesis catalyst is well known to those skilled in the art. The converter comprises a high pressure shell 20 with removable top head 21 and an internal high temperature basket 30 containing the heat exchanger 40, catalyst beds 50, 70 and supporting components.

First catalyst bed 50 comprises a removable insert 50a which hangs from the top flange 35 of the outer basket wall 31. The insert 50a includes outer wall 51, inner wall 52, top support flange 53, top bed inlet distributor 54, catalyst bed zone, and bed support 55. The insert 50a also includes quench piping 56a and distributor 56b, quench mixing plenum 57, and inlet distributor 58 for the second catalyst bed 70. By integrating these components into a single insert 50a, removal of the insert provides full access to the top of second catalyst bed 70 for inspection and catalyst change-out as required.

The weight of the catalyst in the first catalyst bed 50 and insert 50a is carried through the outer wall 51 to the top flange 35 of the outer basket wall 31. The inner wall 52 of the first catalyst bed 50 seals to the top flange 36 of the inner basket wall 32 using an expansion joint 59 such as a bellows or packing gland. In effect, the entire first catalyst bed insert 50a sits in the inlet zone to the second catalyst bed 70 as defined by the inner and outer basket walls 32, 31 above the second catalyst bed 70.

The internal heat exchanger 40 is enclosed in a shroud 43 which attaches to the bottom exchanger tubesheet 44 and hangs from a flange 45 supported from a flanged conical 37 projecting from the inner basket wall 32. The inner basket zone 83 below the conical 37 serves as the tubeside inlet channel for the heat exchanger 40. The inner basket zone 83 above the conical 37 serves as a mixing chamber for blending in bypass gas from the exchanger bypass gas pipe 47a and distributor 47b for temperature control prior to entering the first catalyst bed 50. The depicted design of exchanger 40 supported from conical 37 avoids the need for accessing the bottom of the exchanger to disconnect and remove it and also avoids the need for expansion joints below the exchanger, which is a relatively inaccessible area for maintenance.

The high temperature basket 30 includes a removable top cover plate 34 to seal the basket top and provide access to the catalyst and internals. By removing the cover plate and bypass distributor 47b, the heat exchanger can be easily removed by unbolting the shroud flange 45 from the conical support 37. The expansion joint 59 sealing the inner wall 52 of the first catalyst bed 50 insert can also be easily inspected and replaced as required.

In operation, cool feed gas enters the converter bottom head 22 through nozzle 22a and flows up the annulus between pressure shell 20 and basket 30 where it helps keep the pressure shell cool by absorbing heat leak from the basket. The feed gas enters the annulus between the converter outlet pipe 81 and exchanger shellside feed pipe 82 and flows down and around the exchanger tubeside outlet channel 46 where it enters the shellside of the exchanger 40. The feed gas is preheated flowing downwards through the shellside of the exchanger 40 and then flows upwards inside the annulus between exchanger shroud 43 and exchanger shell 42 to the upper portion of the inner basket zone 83. Feed gas exiting the shroud 43 mixes with exchanger bypass gas from the bypass distributor 47 before entering the first catalyst bed 50 inlet distributor 54.

Feed gas flows through the inlet distributor 54 and enters the catalyst bed zone of the first catalyst bed 50 where reaction occurs and the temperature rises. Hot gas exiting the catalyst bed zone blends with cool feed gas from the quench distributor 56b and flows through the quench mixing plenum 57 before entering the inlet distributor 58 of the second catalyst bed 70. The distributor is integral with the quench mixing plenum so it is also removed with the first catalyst bed 50 insert. Gas flows from the distributor through the second catalyst bed catalyst where additional reaction occurs with associated temperature rise. Hot gas exiting second catalyst bed 70 adjacent bottom basket dome 33 flows through the inner basket wall 32 where it enters the bottom exchanger tubesheet 44 and flows upwards in the tubes 41, providing feed preheat as it cools before being collected in the tubeside outlet channel 46 and exiting in the converter outlet pipe 81 through the top head 21 of the pressure shell 20.

The converter design depicted in FIGS. 1-2, for the purposes of simplicity and clarity, does not show insulation details required to further limit heat leak from the basket 30 to pressure shell 20 as well as limit heat leak between the various warmer and cooler streams inside the basket. Small converters require more extensive insulation to ensure operability than typical converters used in large-scale plants. The effective use of insulation is well understood by those skilled in the art.

In practice, sufficient pressure drop for good distribution through the catalyst beds 50, 70 is achieved by providing an appropriately high ratio of bed depth to cross-sectional flow area in the catalyst beds 50, 70. This is provided by adjusting the annular wall radii of the beds along with the resulting required bed heights to meet the catalyst bed volume requirements. Dimensioning of the beds is done in parallel with the internal heat exchanger design to ensure the bed and exchanger designs are properly integrated for efficient utilization of the converter volume. Integration requires aligning the exchanger tube length with the stacked bed heights, determining the exchanger diameter required to provide the required tube count and surface area and subsequently adjusting the bed wall radii to align with the exchanger diameter while also providing the required cross-sectional areas for flow.

To service the converter 10, the top head 21 can be removed from the shell 20 by removing flange stud nuts (not shown) and disconnecting the pipes 47a, 56a, 81 at the respective couplers 47c, 56c, 81c through a top head manway (not shown). Packing glands (not shown) at the pipe penetrations through the top plate 34 can then be disconnected and removed. The top cover plate 34 can then be unbolted from the basket outer wall top flange 35 and removed. This step also frees up the first bed insert mounting flange 53 which shares common mounting studs with the top cover plate 34. The top inlet distributor 54 can then be removed, first bed 50 unloaded of catalyst and the insert 50a can then be removed, providing full access to the second bed 70 for inspection, catalyst replacement and other maintenance. If desired, the basket 30 can also be removed from the shell 20.

Accordingly, the present invention provides the following Embodiments:

1. An ammonia synthesis converter comprising:
   a shell having a removable top head;
   an annular basket removably mounted in the shell, the annular basket comprising inner and outer walls and defining an annular zone between the inner and outer walls, an inner basket zone located centrally within the inner wall and an outer basket zone between the outer wall and the shell;
   first and second catalyst beds, preferably vertically stacked, in the annular zone of the basket for axial down-flow in series, the first and second catalyst beds comprising catalyst to convert a feed mixture of hydrogen and nitrogen to ammonia;
   a quench gas supply to introduce quench gas into a first effluent from the first catalyst bed and a flow path to introduce the resulting mixture into a top of the second catalyst bed;
   a feed-effluent interchanger in the inner basket zone to receive a second effluent from the second catalyst bed and indirectly heat a feed to the first catalyst bed;

a bypass gas distributor to introduce exchanger bypass gas into the hot feed to the first catalyst bed and a flow path to introduce the resulting mixture into a top of the first catalyst bed; and a flow path to supply the feed through the outer basket zone to the interchanger.

2. The ammonia synthesis converter of Embodiment 1, having a design capacity of 100 MTPD or less.

3. The ammonia synthesis converter of Embodiment 1 or Embodiment 2, wherein the annular basket further comprises a removable top cover plate.

4. The ammonia synthesis converter of any of Embodiments 1 to 3, wherein the feed-effluent interchanger is removably mounted on a conical connected to the inner basket wall.

5. The ammonia synthesis converter of Embodiment 4, wherein the feed-effluent interchanger comprises an external shroud attached to a bottom exchanger inlet tubesheet and open at a top, an outside top shroud flange which attaches to an upper flanged conical support projecting inwards from the inner basket wall, an exchanger shell open at bottom and extending upwards to enclose an exchanger tube outlet channel, contiguous with a shellside feed pipe penetrating a top basket plate, and an exchanger tube outlet channel contiguous with a converter outlet pipe extending upwards from the outlet channel to the top pressure shell head and nested inside the shellside feed pipe to provide preheat of feed gas flowing downwards on the exchanger shellside before returning to the exchanger top via an annulus between exchanger shell and shroud while cooling the effluent from the second catalyst bed flowing up the exchanger tubeside before exiting the top head of the converter.

6. The ammonia synthesis converter of any of Embodiments 1 to 5, wherein the first catalyst bed comprises a single removable insert in an upper portion of the annular zone, the insert depending from a top outer basket flange, the insert comprising inner and outer insert walls, top inlet distributor, a catalyst bed zone, bed support, and an interbed quench system and a gas distributor at a lower end of the insert, the interbed quench system comprising a quench gas distributor and a mixing zone, the gas distributor receiving the gas from the mixing zone and distributing the gas to an inlet to the second catalyst bed.

7. The ammonia synthesis converter of Embodiment 6, further comprising an expansion joint to form a seal between a top of the inner insert wall and a top of the inner basket wall, preferably wherein the expansion joint comprises a bellows or packing gland.

8. The ammonia synthesis converter of Embodiment 6 or Embodiment 7, wherein the second catalyst bed is located directly below the first catalyst bed and is fully accessible from above when the first catalyst bed is removed.

9. The ammonia synthesis converter of any preceding embodiment, wherein the first and second catalyst beds are vertically stacked in the annular zone of the basket.

10. An ammonia synthesis method comprising:
providing a shell with a removable top head;
removably mounting an annular basket in the shell, the annular basket comprising inner and outer walls and defining an annular zone between the inner and outer walls, an inner basket zone located centrally within the inner wall and an outer basket zone between the outer wall and the shell;
passing gas axially in down-flow through first and second catalyst beds disposed in the annular zone of the basket in series, the first and second catalyst beds comprising catalyst to convert a feed mixture of hydrogen and nitrogen to ammonia;
introducing quench gas into a first effluent from the first catalyst bed and introducing the resulting mixture into a top of the second catalyst bed;
receiving a second effluent from the second catalyst bed in a feed-effluent interchanger in the inner basket zone to indirectly heat a feed to the first catalyst bed;
introducing exchanger bypass gas from a bypass gas distributor into the hot feed to the first catalyst bed and introducing the resulting mixture into a top of the first catalyst bed; and
supplying the feed through the outer basket zone to the interchanger.

11. The ammonia synthesis method of Embodiment 10, having a design capacity of 100 MTPD or less.

12. The ammonia synthesis method of Embodiment 10 or Embodiment 11, further comprising removably mounting a top cover plate onto the annular basket, and optionally removing the top cover plate to access the annular basket.

13. The ammonia synthesis method of any of Embodiments 10 to 12, further comprising removably mounting the feed-effluent interchanger on a support connected to the inner basket wall, preferably a frustoconical support.

14. The ammonia synthesis method of Embodiment 13, further comprising:
attaching an external shroud of the feed-effluent interchanger to a bottom exchanger inlet tubesheet;
attaching an outside top shroud flange to an upper flanged conical support projecting inwards from the inner basket wall;
providing an exchanger shell open at a bottom and extending upwards to enclose an exchanger tube outlet channel, contiguous with a shellside feed pipe penetrating a top basket cover plate;
extending a converter outlet pipe upwards from the outlet channel to the pressure shell head and nesting the converter outlet pipe inside the shellside feed pipe to provide preheat of feed gas flowing downwards on the exchanger shellside before returning to the exchanger top via an annulus between exchanger shell and shroud while cooling the effluent from the second catalyst bed flowing up the exchanger tubeside before exiting the top head.

15. The ammonia synthesis method of any of Embodiments 10 to 14, further comprising providing the first catalyst bed as a single removable insert in an upper portion of the annular zone, the insert depending from a top outer basket flange, the insert comprising inner and outer insert walls, top inlet distributor, a catalyst bed zone, bed support and an interbed quench system and gas distributor at a lower end of the insert, the interbed quench system comprising a quench gas distributor and a mixing zone, the gas distributor receiving the gas from the mixing zone and distributing the gas to an inlet to the second catalyst bed.

16. The ammonia synthesis method of Embodiment 15, further comprising sealing a top of the inner insert wall to a top of the inner basket wall, preferably using an expansion joint, more preferably a bellows or packing gland.

17. The ammonia synthesis method of Embodiment 15 or Embodiment 16, further comprising locating the second catalyst bed directly below the first catalyst bed, wherein the second catalyst bed is fully accessible from above when the first catalyst bed is removed.

18. An ammonia synthesis converter having a design capacity of 100 MTPD or less and comprising:

a shell having a removable top head;
an annular basket mounted in the shell, the annular basket comprising inner and outer walls and defining an annular zone between the inner and outer walls, an inner basket zone located centrally within the inner wall and an outer basket zone between the outer wall and the shell;
wherein the annular basket further comprises a removable top cover plate;
first and second catalyst beds disposed in the annular zone of the basket for axial down-flow in series, the first and second catalyst beds comprising catalyst to convert a feed mixture of hydrogen and nitrogen to ammonia, wherein the first catalyst bed comprises a single removable insert in an upper portion of the annular zone, the insert depending from a top outer basket flange, the insert comprising inner and outer insert walls, a top inlet distributor, a catalyst bed zone, bed support, and an interbed quench system and a gas distributor at a lower end of the insert, the interbed quench system comprising a quench gas distributor and a mixing zone, the gas distributor receiving the gas from the mixing zone and distributing the gas to an inlet to the second catalyst bed, wherein the second catalyst bed is located directly below the first catalyst bed and is fully accessible from above when the first catalyst bed is removed;
an expansion joint to form a seal between a top of the inner insert wall and a top of the inner basket wall, preferably wherein the expansion joint comprises a bellows or packing gland;
a quench gas supply to introduce quench gas into a first effluent from the first catalyst bed and a flow path to introduce the resulting mixture into a top of the second catalyst bed;
a feed-effluent interchanger in the inner basket zone to receive a second effluent from the second catalyst bed and indirectly heat a feed to the first catalyst bed, wherein the feed-effluent interchanger is removably mounted on a closed support, preferably a closed inverted frustoconical support, connected to the inner basket wall;
a bypass gas distributor to introduce exchanger bypass gas into the hot feed to the first catalyst bed and a flow path to introduce the resulting mixture into a top of the first catalyst bed; and
a flow path to supply the feed through the outer basket zone to the interchanger.

19. The ammonia synthesis converter of Embodiment 18, wherein the feed-effluent interchanger comprises an external shroud attached to a bottom exchanger inlet tubesheet and open at a top, an outside top shroud flange which attaches to an upper flanged conical support projecting inwards from the inner basket wall, an exchanger shell open at bottom and extending upwards to enclose an exchanger tube outlet channel, contiguous with a shellside feed pipe penetrating a top basket cover plate, and an exchanger tube outlet channel contiguous with a converter outlet pipe extending upwards from the outlet channel to the top pressure shell head and nested inside the shellside feed pipe to provide preheat of feed gas flowing downwards on the exchanger shellside before returning to the exchanger top via an annulus between exchanger shell and shroud while cooling the effluent from the second catalyst bed flowing up the exchanger tubeside before exiting the top head of the converter.

20. A modular catalyst bed insert for an ammonia synthesis converter, comprising:
an annular housing comprising inner and outer insert walls; an outer flange at a top of the outer insert wall for hanging the insert in the converter;
a catalyst bed zone disposed on a bed support between the inner and outer insert walls;
an inlet gas distributor between the inner and outer insert walls disposed above the catalyst bed;
a quench system comprising a quench gas supply pipe passing through the inlet gas distributor, the catalyst bed, and the bed support, to a quench gas distributor disposed in a mixing zone below the bed support for mixing the quench gas with effluent from the catalyst bed; and
an outlet gas distributor located below the mixing zone.

21. A modular catalyst bed for an ammonia synthesis converter, comprising:
an annular basket removably mountable in a reactor shell, the annular basket comprising inner and outer walls and defining an annular zone between the inner and outer walls and an inner basket zone located centrally within the inner wall, a top flange located at a top of the outer wall, and a removable top cover plate removably mountable to the top flange;
first and second catalyst beds disposed in the annular zone of the basket for axial down-flow in series, the first and second catalyst beds comprising catalyst to convert a feed mixture of hydrogen and nitrogen to ammonia, the first catalyst bed disposed in a removable insert disposed in an upper portion of the annular basket and the second catalyst bed disposed in a lower portion of the annular basket directly below the removable insert;
a feed-effluent interchanger in the inner basket zone to receive a second effluent from the second catalyst bed and indirectly heat a feed to the first catalyst bed, wherein the feed-effluent interchanger comprises an external shroud attached to a bottom exchanger inlet tubesheet and open at a top, an outside top shroud flange which attaches to an upper flanged closed support projecting inwards from the inner basket wall, an exchanger shell open at bottom and extending upwards to enclose an exchanger tube outlet channel, contiguous with a shellside feed pipe penetrating a top basket cover plate, and an exchanger tube outlet channel contiguous with a converter outlet pipe extending upwards from the outlet channel through the top cover plate and nested inside the shellside feed pipe passing through the top cover plate to provide preheat of feed gas flowing downwards on the exchanger shellside before returning to the exchanger top via an annulus between exchanger shell and shroud while cooling the effluent from the second catalyst bed flowing up the exchanger tubeside before exiting the modular catalyst bed;
a bypass gas distributor to introduce exchanger bypass gas from a supply pipe passing through the top cover plate into the hot feed to the first catalyst bed and a flow path to introduce the resulting mixture into a top of the first catalyst bed;
wherein the insert comprises:
an annular housing comprising inner and outer insert walls, wherein an upper end of the inner insert wall is spaced below the top cover plate to provide the flow path for feed gas to enter the insert;
an outer flange at a top of the outer insert wall to hang the insert from the top flange of the annular basket;
a catalyst bed zone disposed on a bed support between the inner and outer insert walls;
an inlet gas distributor disposed above the first catalyst bed between the inner and outer insert walls;

a quench system comprising a quench gas supply pipe passing through the top cover plate, the inlet gas distributor, the catalyst bed, and the bed support, to a quench gas distributor disposed in a mixing zone below the bed support for mixing the quench gas with effluent from the catalyst bed; and an outlet gas distributor located below the mixing zone to distribute gas to a top of the second catalyst bed.

22. A method of servicing the ammonia synthesis converter of any of Embodiments 1 to 9, wherein the first catalyst bed comprises a single removable insert in an upper portion of the annular zone, the insert depending from a top outer basket flange, the insert comprising inner and outer insert walls, a top inlet distributor, a catalyst bed zone, bed support and an interbed quench system and a gas distributor at a lower end of the insert, comprising the steps of:

disconnecting internal piping through a manway in the top pressure shell head;

unbolting and removing the top head from the pressure shell;

disconnecting packing glands at the piping penetrations though the top basket cover plate;

unbolting a common mounting for the top cover plate and bed insert;

removing the top cover plate to access the first bed;

removing the top inlet distributor and catalyst in the first catalyst bed;

removing the insert from the upper portion of the annular zone to access the catalyst in the second catalyst bed; and removing the catalyst in the second catalyst bed.

23. The method of Embodiment 22, further comprising removing the feed-effluent interchanger from the inner basket zone.

24. The method of Embodiment 22 or Embodiment 23, further comprising:

replacing the catalyst in the second catalyst bed;

securing the insert in the upper portion of the annular zone;

replacing the catalyst and top inlet distributor in the first catalyst bed;

replacing the top cover plate;

securing the plate and insert to the common mounting flange;

replacing packing glands for piping penetrations through the top cover plate;

securing the top head to the pressure shell; and reconnecting internal piping through the manway in the top pressure shell head.

Various terms have been defined above. To the extent a term used in a claim is not defined above, it should be given the broadest definition persons in the pertinent art have given that term as reflected in at least one printed publication or issued patent.

While the foregoing is directed to certain illustrative embodiments, other and further embodiments of the invention can be devised without departing from the basic scope thereof, and the scope thereof is determined by the claims that follow.

I claim:

1. An ammonia synthesis converter comprising:

a shell having a removable top head;

an annular basket removably mounted in the shell, the annular basket comprising inner and outer walls and defining an annular zone between the inner and outer walls, an inner basket zone located centrally within the inner wall and an outer basket zone between the outer wall and the shell;

first and second catalyst beds disposed in the annular zone of the basket for axial down-flow in series, the first and second catalyst beds comprising catalyst to convert a mixture of hydrogen and nitrogen to ammonia;

an insert received in the annular basket, the insert comprising the first catalyst bed, the insert removable from the annular basket, the insert comprising an interbed quench system;

a quench gas supply to the interbed quench system in the insert to introduce quench gas into a first effluent from the first catalyst bed and a flow path to introduce the resulting mixture of the quench gas and the first effluent into a top of the second catalyst bed;

a feed-effluent interchanger in the inner basket zone to receive a second effluent from the second catalyst bed and indirectly heat a gas feed mixture to the first catalyst bed;

a bypass gas distributor to introduce exchanger bypass gas into the heated gas feed mixture to the first catalyst bed and a flow path to introduce the resulting bypass-feed mixture into a top of the first catalyst bed; and a flow path to supply the gas feed mixture through the outer basket zone to the interchanger.

2. The ammonia synthesis converter of claim 1, having dimensions for a design capacity of 100 metric tons per day (MTPD) or less.

3. The ammonia synthesis converter of claim 1, wherein the annular basket further comprises a removable top cover plate.

4. The ammonia synthesis converter of claim 1, wherein the feed-effluent interchanger is removably mounted on a conical support connected to the inner wall of the basket.

5. The ammonia synthesis converter of claim 4, wherein the feed-effluent interchanger comprises an external shroud attached to a bottom exchanger inlet tubesheet and open at a top, an outside top shroud flange which attaches to an upper flanged conical support projecting inwards from the inner wall of the basket, an exchanger shell open at its bottom and extending upwards to enclose an exchanger tube outlet channel, contiguous with a shellside feed pipe penetrating a top basket cover plate, and an exchanger tube outlet channel contiguous with a converter outlet pipe extending upwards from the outlet channel to the top head and nested inside the shellside feed pipe to provide preheat of the feed mixture flowing downwards on the exchanger shellside before returning to the exchanger top via an annulus between the exchanger shell and the shroud while cooling the second effluent from the second catalyst bed flowing up the exchanger tubeside before exiting the top head of the converter.

6. The ammonia synthesis converter of claim 1, wherein the insert comprises a single removable insert in an upper portion of the annular zone, the insert depending from a top outer basket flange, the insert comprising inner and outer insert walls, a top inlet distributor, a catalyst bed zone, bed support, and the interbed quench system and an outlet distributor at a lower end of the insert, the interbed quench system comprising a quench gas distributor and a mixing zone, the outlet distributor receiving the gas from the mixing zone and distributing the gas to the top of the second catalyst bed.

7. The ammonia synthesis converter of claim 6, further comprising an expansion joint to form a seal between a top of the inner insert wall and a top of the inner wall of the basket.

8. The ammonia synthesis converter of claim 6, wherein the second catalyst bed is located directly below the first catalyst bed and is fully accessible from above when the insert is removed.

9. The ammonia synthesis converter of claim 6, wherein the single removable insert comprises a modular catalyst bed insert, comprising:
- an annular housing comprising the inner and outer insert walls;
- an outer flange at a top of the outer insert wall for hanging the insert in the converter;
- wherein the catalyst bed zone is disposed on the bed support between the inner and outer insert walls;
- wherein the top inlet distributor is disposed between the inner and outer insert walls above the catalyst bed;
- wherein the quench system comprises a quench gas supply pipe passing through the inlet distributor, the catalyst bed, and the bed support, to the quench gas distributor disposed in the mixing zone below the bed support for mixing the quench gas with effluent from the catalyst bed; and
- wherein the outlet distributor is located below the mixing zone.

10. The ammonia synthesis converter of claim 1, wherein the first and second catalyst beds are vertically stacked in the annular zone of the annular basket.

11. An ammonia synthesis method comprising:
- providing an ammonia synthesis converter having a shell with a removable top head;
- removably mounting an annular basket in the shell, the annular basket comprising inner and outer walls and defining an annular zone between the inner and outer walls, an inner basket zone located centrally within the inner wall and an outer basket zone between the outer wall and the shell;
- removably disposing an insert in the annular basket, the insert comprising an interbed quench system;
- disposing first and second catalyst beds in the annular zone of the basket, the first and second catalyst beds comprising catalyst to convert a mixture of hydrogen and nitrogen to ammonia, wherein the first catalyst bed is disposed in the insert;
- passing gas axially in down-flow through the first and second catalyst beds in series;
- supplying quench gas to the interbed quench system in the insert to introduce the quench gas into a first effluent from the first catalyst bed and introducing the resulting mixture of the quench gas and the first effluent into a top of the second catalyst bed;
- receiving a second effluent from the second catalyst bed in a feed-effluent interchanger in the inner basket zone to indirectly heat a gas feed mixture to the first catalyst bed;
- introducing exchanger bypass gas from a bypass gas distributor into the heated gas feed mixture to the first catalyst bed and introducing the resulting bypass-feed mixture into a top of the first catalyst bed; and
- supplying the bypass-feed mixture through the outer basket zone to the interchanger.

12. The ammonia synthesis method of claim 11, comprising operating the ammonia synthesis converter to produce ammonia at a rate of 100 metric tons per day (MTPD) or less.

13. The ammonia synthesis method of claim 11, further comprising removably mounting a top cover plate onto the annular basket, and removing the top cover plate to access the annular basket.

14. The ammonia synthesis method of claim 11, further comprising removably mounting the feed-effluent interchanger on a conical support connected to the inner wall of the basket.

15. The ammonia synthesis method of claim 14, further comprising:
- attaching an external shroud of the feed-effluent interchanger to a bottom exchanger inlet tubesheet;
- attaching an outside top shroud flange to an upper flange of the conical support projecting inwards from the inner wall of the basket;
- providing an exchanger shell open at a bottom and extending upwards to enclose an exchanger tube outlet channel, contiguous with a shellside feed pipe penetrating a top basket cover plate;
- extending a converter outlet pipe upwards from the outlet channel to the top head and nesting the converter outlet pipe inside the shellside feed pipe to provide preheat of the gas feed mixture flowing downwards on the exchanger shellside before returning to the exchanger top via an annulus between the exchanger shell and the shroud while cooling the second effluent from the second catalyst bed flowing up the exchanger tubeside before exiting the top head.

16. The ammonia synthesis method of claim 11, further comprising providing the insert as a single insert in an upper portion of the annular zone, the insert depending from a top outer basket flange, the insert comprising inner and outer insert walls, top inlet distributor, a catalyst bed zone, bed support, and the interbed quench system and an outlet distributor at a lower end of the insert, wherein the interbed quench system comprises a quench gas distributor and a mixing zone, the outlet distributor receiving the gas from the mixing zone and distributing the gas to to the top of the second catalyst bed.

17. The ammonia synthesis method of claim 16, further comprising sealing a top of the inner insert wall to a top of the inner wall of the basket using an expansion joint.

18. The ammonia synthesis method of claim 16, further comprising locating the second catalyst bed directly below the first catalyst bed, and removing the insert to access the second catalyst bed from above.

19. An ammonia synthesis converter having dimensions for a design capacity of 100 metric tons per day (MTPD) or less and comprising:
- a shell having a removable top head;
- an annular basket mounted in the shell, the annular basket comprising inner and outer walls and defining an annular zone between the inner and outer walls, an inner basket zone located centrally within the inner wall and an outer basket zone between the outer wall and the shell;
- wherein the annular basket further comprises a removable top cover plate;
- first and second catalyst beds disposed in the annular zone of the basket for axial down-flow in series, the first and second catalyst beds comprising catalyst to convert a mixture of hydrogen and nitrogen to ammonia, wherein the first catalyst bed comprises a single removable insert in an upper portion of the annular zone, the insert depending from a top outer basket flange, the insert comprising inner and outer insert walls, a top inlet distributor, a catalyst bed zone, a bed support, and an interbed quench system and an outlet distributor at a lower end of the insert, the interbed quench system comprising a quench gas distributor and a mixing zone, the outlet distributor receiving the resulting mixture from the mixing zone and distributing the resulting mixture to to the top of the second catalyst bed, wherein the second catalyst bed is located directly below the first catalyst bed and is fully accessible from above when the insert is removed;

an expansion joint to form a seal between a top of the inner insert wall and a top of the inner wall of the basket;

a quench gas supply to introduce the quench gas to the distributor;

a feed-effluent interchanger in the inner basket zone to receive a second effluent from the second catalyst bed and indirectly heat a gas feed mixture to the first catalyst bed, wherein the feed-effluent interchanger is removably mounted on a closed support connected to the inner wall of the basket;

a bypass gas distributor to introduce exchanger bypass gas into the heated gas feed mixture to the first catalyst bed and a flow path to introduce the resulting bypass-feed mixture into a top of the first catalyst bed; and a flow path to supply the gas feed mixture through the outer basket zone to the interchanger.

20. The ammonia synthesis converter of claim 19, wherein the closed support is conical, wherein the feed-effluent interchanger comprises an external shroud attached to a bottom exchanger inlet tubesheet and open at a top, an outside top shroud flange which attaches to an upper flange of the closed support projecting inwards from the inner wall of the basket, an exchanger shell open at its bottom and extending upwards to enclose an exchanger tube outlet channel, contiguous with a shellside feed pipe penetrating a top basket cover plate, and an exchanger tube outlet channel contiguous with a converter outlet pipe extending upwards from the outlet channel to the top head and nested inside the shellside feed pipe to provide preheat of the gas feed mixture flowing downwards on the exchanger shellside before returning to the exchanger top via an annulus between the exchanger shell and the shroud while cooling the second effluent from the second catalyst bed flowing up the exchanger tubeside before exiting the top head of the converter.

21. An ammonia synthesis converter comprising a modular catalyst bed system, the ammonia synthesis converter comprising:

an annular basket removably mountable in a reactor shell, wherein the reactor shell has a removable top head, wherein the annular basket comprises inner and outer walls and defines an annular zone between the inner and outer walls and an inner basket zone located centrally within the inner wall, a top flange located at a top of the outer wall, and a removable top basket cover plate removably mountable to the top flange;

first and second catalyst beds vertically stacked in the annular zone of the basket for axial down-flow in series, the first and second catalyst beds comprising catalyst to convert a feed mixture of hydrogen and nitrogen to ammonia, the first catalyst bed disposed in a removable insert disposed in an upper portion of the annular basket and the second catalyst bed disposed in a lower portion of the annular basket directly below the removable insert;

a feed-effluent interchanger in the inner basket zone to receive a second effluent from the second catalyst bed and indirectly heat the feed mixture to the first catalyst bed, wherein the feed-effluent interchanger comprises an external shroud attached to a bottom exchanger inlet tubesheet and open at a top, an outside top shroud flange which attaches to an upper flanged closed support projecting inwards from the inner wall of the basket, an exchanger shell open at its bottom and extending upwards to enclose an exchanger tube outlet channel, contiguous with a shellside feed pipe penetrating the top basket cover plate, and an exchanger tube outlet channel contiguous with a converter outlet pipe extending upwards from the outlet channel through the top basket cover plate and nested inside the shellside feed pipe passing through the top basket cover plate to provide preheat of the feed mixture flowing downwards on the exchanger shellside before returning to the exchanger top via an annulus between the exchanger shell and the shroud while cooling the second effluent from the second catalyst bed flowing up the exchanger tubeside before exiting the modular catalyst bed;

a bypass gas distributor to introduce exchanger bypass gas from a supply pipe passing through the top basket cover plate into the heated gas feed mixture to the first catalyst bed and a flow path to introduce the resulting bypass-feed mixture into a top of the first catalyst bed;

wherein the insert comprises:

an annular housing comprising inner and outer insert walls, wherein an upper end of the inner insert wall is spaced below the top cover plate to provide the flow path for the feed mixture to enter the insert;

an outer flange at a top of the outer insert wall to hang the insert from the top flange of the annular basket;

a catalyst bed zone disposed on a bed support between the inner and outer insert walls;

an inlet gas distributor disposed above the first catalyst bed between the inner and outer insert walls;

a quench system comprising a quench gas supply pipe passing through the top basket cover plate, the inlet gas distributor, the first catalyst bed, and the bed support, to a quench gas distributor disposed in a mixing zone below the bed support for mixing the quench gas with a first effluent from the first catalyst bed; and an outlet distributor located below the mixing zone to distribute gas from the mixing zone to a top of the second catalyst bed.

22. A method of servicing the ammonia synthesis converter of claim 1, comprising the steps of:

disconnecting the quench gas supply and the bypass gas distributor;

removing the top head from the shell;

removing catalyst in the first catalyst bed;

removing the insert from the annular basket to access the catalyst in the second catalyst bed; and removing the catalyst in the second catalyst bed.

23. The method of claim 22, further comprising removing the feed-effluent interchanger from the inner basket zone.

24. The method of claim 22, further comprising:

replacing the catalyst in the second catalyst bed;

securing the insert in the annular basket;

replacing the catalyst in the first catalyst bed; and securing the top head to the shell.

\* \* \* \* \*